G. H. RUGG.
Lubricating Axles for Vehicles.

No. 158,003. Patented Dec. 22, 1874.

WITNESSES.  INVENTOR.

UNITED STATES PATENT OFFICE.

GEORGE H. RUGG, OF MINNEAPOLIS, MINNESOTA.

IMPROVEMENT IN LUBRICATING-AXLES FOR VEHICLES.

Specification forming part of Letters Patent No. 158,003, dated December 22, 1874; application filed November 19, 1874.

*To all whom it may concern:*

Be it known that I, GEO. H. RUGG, a resident of the city of Minneapolis, county of Hennepin and State of Minnesota, have invented a new and useful Improvement in Vehicle-Axles, of which the following is a full, clear, and exact description, reference being had to the accompanying drawings, being made a part of this specification, in which—

Figure 1:
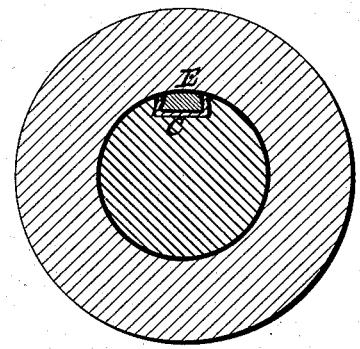
Figure 2:
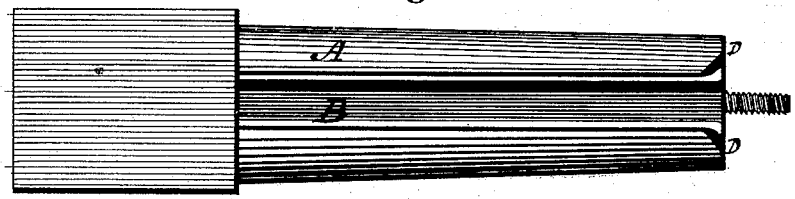
Figure 3:
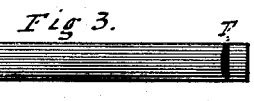

Figure 1 is a cross-section. Fig. 2 is a top view of axle. Fig. 3 is a perspective view of the fillet.

The object of my invention is to enable any person having a vehicle to oil the wheels and axles thereof without removing the wheels.

To enable others skilled in the art to make and use my invention, I will proceed to describe the precise manner in which I have carried it out.

I take the cast-iron skein, wrought-iron or steel axle A, and form in its upper side a groove, B, whose width is in proportion to the size of the axle. In the formation of this groove I make its base wider than its top, thereby giving its sides a beveled form, that they may retain the oil or grease cup C. Fitting into the oil or grease cup C is the fillet E, which, when in position, completes the round of the axle. To enable the operator to readily pull out the oil or grease cup C one or two lugs, D D, are attached to its outer end, the notch F being formed in the outer end of the fillet E for the same purpose. The groove in the axle may extend the length of the hub or less, as may be desired, the fillet E, together with the oil or grease cup C, completely filling up the groove.

In using my invention the nut is taken off from the outer end of the axle, and the fillet E, together with the oil-box C, is withdrawn from the groove therein. The fillet E having been removed from the oil-box C, said box is filled with the lubricating material and replaced in the groove B. The fillet E is then replaced, forcing the oil out of the box C and into the hub of the vehicle and around the axle. The nut is then replaced and the same operations gone through with the other wheels.

I am aware that axles of vehicles have been grooved and plugs used for pressing back the lubricant; but this is not my invention.

Having thus described my invention, what I claim as new, and wish to secure by Letters Patent, is—

1. The oil-box C, with its fillet E, to operate within a groove in the spindle or skein of a vehicle-axle, substantially as and for the purposes specified.

2. A spindle or skein of a vehicle-axle, having a groove, in combination with an oil-cup and fillet, substantially as and for the purposes specified.

GEO. H. RUGG.

Witnesses:
C. F. WASHBURN,
F. M. COMSTOCK.